United States Patent [19]
Kikugawa et al.

[11] 3,919,194

[45] Nov. 11, 1975

[54] S-SUBSTITUTED 2-THIOADENOSINE-5'-MONOPHOSPHATES AND PROCESS FOR PRODUCING THE SAME

[75] Inventors: Kiyomi Kikugawa; Hideo Suehiro, both of Kokubunji; Motonobu Ichino; Tokuro Nakamura, both of Mitaka, all of Japan

[73] Assignee: Kohjin Co., Ltd., Tokyo, Japan

[22] Filed: July 10, 1973

[21] Appl. No.: 378,116

[30] Foreign Application Priority Data
Dec. 26, 1972  Japan............................ 47-129619
Dec. 26, 1972  Japan............................ 47-129620
Mar. 12, 1973  Japan............................ 48-27985
Mar. 23, 1973  Japan............................ 48-32703

[52] U.S. Cl......................... 260/211.5 R; 424/180
[51] Int. Cl.²........................................ C07H 19/20
[58] Field of Search..................... 260/211.5 R

[56] References Cited
UNITED STATES PATENTS

| | | | |
|---|---|---|---|
| 3,380,996 | 4/1968 | Honjo et al. | 260/211.5 R |
| 3,413,282 | 11/1968 | Yoshikawa et al. | 260/211.5 R |
| 3,444,158 | 5/1969 | Honjo et al. | 260/211.5 R |
| 3,464,973 | 9/1969 | Ouchi et al. | 260/211.5 R |
| 3,466,273 | 9/1969 | Sowa et al. | 260/211.5 R |
| 3,703,507 | 11/1972 | Haskell et al. | 260/211.5 R |
| 3,752,804 | 8/1973 | Imai et al. | 260/211.5 R |
| 3,781,274 | 12/1973 | Maguire et al. | 260/211.5 R |

*Primary Examiner*—Johnnie R. Brown
*Attorney, Agent, or Firm*—Sughrue, Rothwell, Mion, Zinn & Macpeak

[57] ABSTRACT

Novel S-substituted 2-thioadenosine-5'-monophosphate and the salt thereof which are useful as a coronary vascular vasodilator and an aggregation inhibitor for blood platelets and a process for producing an S-substituted 2-thioadenosine-5'-monophosphate and the salt thereof by phosphorylation of an S-substituted 2-thioadenosine are disclosed.

18 Claims, No Drawings

S-SUBSTITUTED 2-THIOADENOSINE-5'-MONOPHOSPHATES AND PROCESS FOR PRODUCING THE SAME

BACKGROUND OF THE INVENTION

1. Field of the Invention

The present invention relates to a novel S-substituted 2-thioadenosine-5'-monophosphate and the salt thereof and to a process for producing the same by acting a phosphorylating agent on an S-substituted 2-thioadenosine. It also relates to a coronary vascular vasodilator and an aggregation inhibitor for blood platelets comprising the above-described compounds.

2. Description of the Prior Art

Michael et al have already found that 2-methylthioadenosine-5'-monophosphate shows an aggregation inhibition activity on blood platelets with small toxicity ("Nature," vol. 222, p. 1073, 1969; British Pat. No. 1,226,699; and U.S. Pat. No. 3,678,162).

However, this compound does not provide a sufficient aggregation inhibition activity on blood platelets.

SUMMARY OF THE INVENTION

As a result of extensive investigations to develop an adenosine-5'-monophosphate derivative useful as a remedy for thrombosis and as an aggregation inhibitor for blood platelets, the inventors have discovered novel S-substituted 2-thioadenosine-5'-monophosphates and the salt thereof by phosphorylating a hydroxy group located at the 5'-position of an S-substituted 2-thioadenosine. The object of the present invention is to provide the above-described compounds, a process effective for producing the compounds and a useful coronary vascular vasodilator and an aggregation inhibitor for blood platelets.

DETAILED DESCRIPTION OF THE INVENTION

The present invention relates to an S-substituted 2-thioadenosine-5'-monophosphates represented by the following general formula;

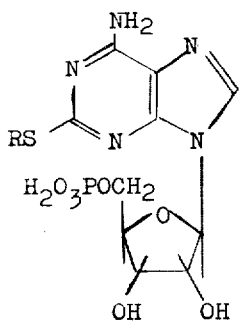

and the salt thereof, wherein R represents a primary or secondary alkyl group having five to 10 carbon atoms, a cycloalkyl group having five to 10 carbon atoms, a cycloalkylmethyl group, a benzyl group, a p-substituted benzyl group, an allyl group, or a β- or γ-substituted allyl group.

As the alkyl group having five to 10 carbon atoms, there are illustrated an n-amyl group, an iso-amyl group, a n-hexyl group, a n-heptyl group, a n-octyl group, a n-nonyl group, a n-decyl group, a 2-ethyl-n-hexyl group, and the like. As the cycloalkyl group, there are a cyclopentyl group, a cyclohexyl group, a cycloheptyl group, and the like. As the cycloalkylmethyl group, those having five to 10 carbon atoms, in particular cyclohexylmethyl, etc., are preferable. As the p-substituted benzyl group, there are a p-chlorobenzyl group, a p-nitrobenzyl group, etc. and, as the β- or γ-substituted allyl group, there are a trans-crotyl group, a β-methallyl group, and the like.

S-substituted 2-thioadenosine-5'-monophosphates are produced by phosphorylating a hydroxy group located at 5'-position of a corresponding S-substituted 2-thioadenosine.

In the process of the invention, a phosphorylating agent may be acted on the starting material in which hydroxy groups at 2'- and 3'-positions thereof are protected with commonly employed protectives such as acetyl, benzoyl, isopropylidene, etc. Or else, a hydroxy group at 5'-position may selectively be phosphorylated by acting, under suitable reaction conditions, a phosphorylating agent on the starting material in which hydroxy groups as 2'- and 3'-positions are not protected.

As the phosphorylating agent to be applied to a S-substituted 2-thioadenosine whose hydroxy groups at 2'- and 3'-positions are protected, phosphorus oxychloride, phosphorus pentachloride, partially hydrated phosphorus oxychloride, pyrophosphoryl chloride, or the like is used in the presence or absence of a suitable organic solvent according to the phosphorylating method usually practiced for nucleoside.

Also, a hydroxy group at 5'-position of a S-substituted 2-thioadenosine whose hydroxy groups at 2'- and 3'-positions are not protected may selectively be phosphorylated. That is, a hydroxy group at 5'-position of the starting material wherein hydroxy groups at 2'- and 3'-positions are not protected may selectively and quantitatively be phosphorylated by acting phosphorus oxychloride, partially hydrated phosphorus oxychloride, phosphorus pentachloride or pyrophosphoryl chloride on the starting material in the presence or absence of an organic solvent such as m-cresol, acetonitrile, triethyl phosphate, ethyl acetate, pyridine, or the like.

In the present invention, the phosphorylating agent is used in an amount equimolar to the starting material or more than that and, suitably in an amount 2 – 10 times the equimolar amount. The reaction is in general conducted at about −25°C to about +30°C for 1 – 10 hours. The thus obtained reaction product is converted to a 5'-phosphate derivative by adding thereto ice-water to hydrolyze. Where the thus hydrolyzed product is a 2',-3'-isopropylidene derivative, the isopropylidene group may be removed by, e.g., hydrolyzing at 60°C for 1 hour at pH 2, whereas where the hydrolyzed product is a 2',3'-di-O-acetyl derivative, the acetyl groups may be removed by, e.g., hydrolyzing at 37°C for 24 hours at pH 10. The thus obtained S-substituted 2-thioadenosine-5'-monophosphate may be collected as a H type compound or as a pharmacologically acceptable salt such as Li salt-type, 2Li salt-type, Na salt-type, 2Na salt-type, K salt-type, 2K salt-type, NH₄ salt-type, 2NH₄ salt-type, Ba salt-type compound, or the like.

S-substituted 2-thioadenosine-5'-monophosphates obtained by the present invention showed 30 – 90% inhibition of adenosine-5'-diphosphate($10^{+5}$M)-induced aggregation of blood platelet suspension according to the method of Born and Cross ("Journal of Physiology," vol. 168, p. 178, 1963) using a suspension containing platelets of human or rabbit at a level of $10^{-5}$M as shown in the following example in the Table II. This inhibition activity does not dissipate but lasts even when treated in plasma at 37°C for 120 minutes. The compounds of the present invention show far stronger aggregation inhibition activity on blood platelets as compared with the homologous compound, 2-methyl-thioadenosine-5'-monophosphate. Therefore, the compounds of the invention are of extremely great utility value as a medicine.

The starting S-substituted 2-thioadenosine may be prepared by reacting 2-thioadenosine with a halogenated hydrocarbon, by reaction an S-substituted 2-thio-6-benzoyladenine with 2,3,5-tri-O-acyl-$\beta$-D-ribofuranosyl halide, or by reacting an S-substituted 2-thio-6-chloropurine with tetra-O-acetylribofuranose, as described in Japanese Pat. Application Nos. 60464/72; 57366/72; 59423/72; 59422/72 and 57365/72.

The process for producing S-substituted 2-thioadenosines is illustrated below.

REFERENCE EXAMPLE 1

2-Benzylthioadenosine 10 m moles of 2-benzylthio-6-chloropurine and 10 m moles of tetra-O-acetyl-ribofuranose were mixed and reacted with each other at 140° – 160°C for 20 minutes under reduced pressure. Thereafter, 100 ml of an absolute methanol containing ammonia was added thereto and treated at 0°C for 2 days. After concentrating the mixture, ethanol was added thereto to obtain a crystalline product. Recrystallization from water-ethanol yielded 3.1 g (74% yield) of the desired product having a melting point of 151° – 154°C.

| $R_f$ value in paper chromatography (solvent: n-butanol/water = 84:16) | | 0.73 | |
|---|---|---|---|
| UV: | $\lambda$max (pH 1) | 272.5 | m$\mu$ ($\epsilon$: 17000) |
| | $\lambda$max (pH 7) | 235 | m$\mu$ ($\epsilon$: 24100) |
| | | 278 | m$\mu$ ($\epsilon$: 16000) |
| | $\lambda$max (pH 13) | 234 | m$\mu$ ($\epsilon$: 24600) |
| | | 278 | m$\mu$ ($\epsilon$: 16000) |

Elementary Analysis:

Calcd. for $C_{17}H_{19}O_4N_5S \cdot \frac{1}{2}H_2O \cdot \frac{1}{2}C_2H_5OH$: C, 51.29; H, 5.49; N, 16.61; S, 7.60 %. Found: C, 51.40; H, 5.52; N, 16.73; S, 7.45 %.

REFERENCE EXAMPLE 2

2-Benzylthioadenosine 10 m moles of 2-benzylthio-6-benzoyladenine was added to 50 ml of a 50% ethanol, and 10 m moles of corrosive sublimate was added thereto. Upon adding thereto 0.4 ml of a 10% sodium hydroxide solution, there was obtained a HgCl salt of 2-benzylthio-6-benzoyladenine as a precipitate. The thus formed precipitate was filtered, dried and added to 200 ml of anhydrous xylene. Thereafter, 100 ml of a xylene solution containing 12 m moles of 2,3,5-tri-O-benzoyl-$\beta$-D-ribofuranosyl bromide was gradually added thereto and the mixture was refluxed for 3 hours. Then, the resulting filtrate was concentrated, dissolved in chloroform, washed with a 30% potassium iodide solution then with water, dried and concentrated to dryness. To the residue was added 100 ml of an absolute methanol containing ammonia and, after treating for 2 days at 0°C, concentrated, followed by adding thereto ethanol to obtain a crystalline product. Recrystallization from water ethanol-yielded 2.52 g (60% yield) of the desired product having a melting point of 152° – 154°C.

| $R_f$ value in paper chromatography (solvent: n-butanol/water = 84:16) | | 0.73 | |
|---|---|---|---|
| UV: | $\lambda$max (pH 1) | 272.5 | m$\mu$ ($\epsilon$: 17000) |
| | $\lambda$max (pH 7) | 235 | m$\mu$ ($\epsilon$: 24100) |
| | | 278 | m$\mu$ ($\epsilon$: 16000) |
| | $\lambda$max (pH 13) | 234 | m$\mu$ ($\epsilon$: 24600) |
| | | 278 | m$\mu$ ($\epsilon$: 16000) |

Elementary analysis:

Calcd. for $C_{17}H_{19}O_4N_5S \cdot \frac{1}{2}H_2O \cdot \frac{1}{2}C_2H_5OH$: C, 51.29; H, 5.49; N, 16.61; S, 7.60 %. Found: C, 51.30; H, 5.71; N, 16.71; S, 7.34 %.

REFERENCE EXAMPLE 3

2(-n-Amylthio)adenosine 200 mg (0.63 m moles) of 2-thioadenosine was dissolved in 8 ml of water containing 2.1 m mols of sodium hydroxide, and 952 mg (6.3 m moles) of n-amylbromide was added thereto and the mixture was reacted for 4 days at 25°C under stirring. The precipitate formed was filtered and recrystallized from water. Thus, there was obtained 211.5 mg (91% yield) of the desired product having a melting point of 179° – 181°C.

| UV: | $\lambda$max (pH 1) | 272 m$\mu$ |
|---|---|---|
| | $\lambda$max (pH 7) | 237 m$\mu$, 278 m$\mu$ |
| | $\lambda$max (pH 13) | 236 m$\mu$, 279 m$\mu$ |

Elementary analysis:

Calcd. for $C_{15}H_{23}O_4N_5S$: C, 48.76; H, 6.27; N, 18.95 %. Found: C, 48.65; H, 6.21; N, 19.08 %.

The present invention will now be described in greater detail by the following examples of the preferred embodiments of the invention, but they are not to be construed as limiting the scope of this invention.

EXAMPLE 1

0.739 Gram (2 m moles) of 2-isoamylthioadenosine was dispersed in a mixture of 2 ml of acetonitrile and 0.78 ml of pyridine, and 0.816 ml (8.8 m moles) of phosphorus oxychloride was added thereto under cooling. Then, 0.072 ml (4 m moles) of water was added thereto and the reaction was conducted for 6 hours. The reaction was discontinued by adding ice-water to the reaction mixture and, after hydrolysis, the hydrolyzed solution was adsorbed on 20 g of active carbon. After washing with water, the active carbon column was subjected to elution with 800 ml of a 10% ammonia-ethanol (1:1) and the resulting eluate was concentrated to dryness. The residue was fractionated and purified on a cellulose column (1.7 × 40 cm) by eluting with a solvent of n-propanol-ammonia-water (20:10:3). The precipitated formed by adding an ethanol solution of barium iodide was collected by centrifugation. After repeated purification from water-ethanol, there was obtained 2-isoamylthioadenosine-5'-monophosphate barium salt in 95% yield.

| UV: $\lambda$max (pH 1) 273 m$\mu$ ($\epsilon_p$: 14000) | |
|---|---|
| $R_f$ value in paper chromatography (solvent: n-propanol/ammonia/water = 20:10:3) mono spot | 0.72 |
| Migration in electrophoresis: (pH 7.5; 0.05 M phosphate buffer; 1000 V; 1 hour; control 5'-AMP: +4.7 cm) mono spot | +3.2 cm |

Inorganic phosphoric acid was released in 100% yield when the product was treated with 5'-nucleotidase of Crotalus Atrox Venom or with phosphomonoesterase of intestinal mucous membrane of cows.

EXAMPLE 2

0.779 Gram (2 m moles) of 2',3'-O-isopropylidene-2-isoamylthioadenosine was cooled in a dry ice-acetone bath, and 1.5 g (6 m moles) of pyrophosphoryl chloride was added thereto. The resulting mixture was warmed to 20°C and stirring was continued for 4 hours. Thereafter, the mixture was again cooled in the dry-ice-acetone bath and 1.5 ml of water was added thereto. Then, the mixture was again warmed to 20°C, and 50 ml of water was added thereto followed by stirring for 5 hours at 20°C. To the solution was then added 1M ammonium hydroxide solution to adjust the pH to 8.5. The precipitate formed was filtered off and the filtrate was concentrated. The resulting concentrate was placed on a cellulose column and eluted with a solvent of n-propanol-ammonia-water (20:10:3). Fractions containing the desired product was collected and concentrated to dryness. Upon adding acetone to the residue, there was obtained a crude powder which was then reprecipitated using methanol-acetone to give 2-isoamylthioadenosine-5'-monophosphate ammonium salt in 60% yield.

The thus obtained power exhibited quite the same activity to an enzyme as that of the product obtained in Example 1.

EXAMPLE 3

370 mg (1 m mole) of 2-n-amylthioadenosine was suspended in a mixture of 1 ml of acetonitrile and 0.39 ml of pyridine, and 0.408 ml (4.4 m moles) of phosphorus oxychloride was added thereto under cooling. Then, 0.036 ml (2m moles) of water was added thereto and the reaction was conducted for 6 hours. Icewater was added to the reaction mixture to discontinue the reaction, and the precipitate formed was collected by centrifugation. A preparative paper chromatography was conducted using as a solvent isopropanol-ammonia-water (7:1:2) and fractions whose $R_f$ value was 0.50 were collected and concentrated. The resulting concentrate was dissolved in 1 ml of water and hydrochloric acid was added to the solution to form a precipitate. The thus formed precipitate was collected by centrifugation, washed with water and dried to give 2-n-amylthio-adenosine-5'-monophosphate in 90% yield.

| UV: | λmax (pH 1) | 273 mμ ($\epsilon_p$: 14000) |
| --- | --- | --- |
| | λmax (pH 7) | 236 mμ ($\epsilon_p$: 20000) |
| | | 278 mμ ($\epsilon_p$: 14000) |
| | λmax (pH 13) | 236 mμ ($\epsilon_p$: 20500) |
| | | 278 mμ ($\epsilon_p$: 13900) |
| $R_f$ value in paper chromatography (solvent: isopropanol/ammonia/water = 7:1:2) mono spot | | 0.50 |
| Migration in electrophoresis: (pH 7.5; 0.05M phosphate buffer; 1000 V; 1 hour; control: 5'-AMP, +4.7 cm) | | +3.2 cm |
| Release of inorganic phosphoric acid by 5'-nucleotidase of Crotalus Atrox Venom: | | 98 mole % |
| Content of inorganic phosphoric acid: | | 0.3 mole % |

Elementary analysis:
Calcd. for $C_{15}H_{24}O_7N_5SP \cdot 2H_2O$: C, 38.38; H, 6.01; N, 14.92; P, 6.60%. Found: C, 38.40; H, 6.28; N, 14.75; P, 6.71%.

EXAMPLE 4

0.752 Gram (2m moles) of 2-allylthioadenosine was suspended in a mixture of 2 ml of acetonitrile and 0.78 ml of pyridine, and 0.816 ml (8.8 m moles) of phosphorus oxychloride was added thereto under cooling. Then, 0.072 ml (4 m moles) of water was added thereto, and the reaction was conducted for 6 hours. Ice-water was added thereto to discontinue the reaction and hydrolyze. The resulting hydrolyzed solution was then adsorbed on 20 g of active carbon and washed with water. The active carbon column was subjected to elution with 800 ml of 10% aqueous ammonia-ethanol (1:1), and the eluate was concentrated to dryness. The resulting residue was then placed on a cellulose column (1.7 × 40 cm) and eluted with a solvent of isopropanol-ammonia-water (7:1:2). Fractions having a $R_f$ value of 3.2 as determined by paper chromatography in the same solvent system were pooled and concentrated. To the concentrate was added an ethanolic solution of barium iodide, and the precipitate formed was collected by centrifugation. After repeating precipitation with water-ethanol, there was obtained 1.00 g (about 90% yield) of 2-allylthio-adenosine-5'-monophosphate barium salt.

| UV: | λmax (pH 1) | 272 mμ ($\epsilon_p$: 16000) |
| --- | --- | --- |
| | λmax (H$_2$O) | 234 mμ ($\epsilon_p$: 20400) |
| | | 277 mμ ($\epsilon_p$: 14400) |
| | λmax (pH 13) | 278 mμ ($\epsilon_p$: 15000) |
| $R_f$ value in paper chromatography (solvent: isopropanol/ammonia/water = 7:1:2) | | 0.32 |
| Migration in electrophoresis: (pH 7.5; 0.05 phosphate buffer; 1000 V; 1 hour; control: 5'-adenylic acid, +8.0 cm) | | +6.7 cm |
| Release of inorganic phosphoric acid by 5'-nucleotidase of Crotalus Atrox Venom | | 104 mole % |
| Content of inorganic phosphoric acid | | 0 mole % |

Elementary analysis:
Calcd. for $C_{13}H_{16}O_7N_5SP \cdot Ba \cdot 2H_2O$: C, 26.43; H, 3.41; N, 11.86 %. Found: C, 26.69; H, 3.23; N, 11.70 %.

EXAMPLE 5

0.844 Gram of 2-benzylthioadenosine was suspended in a mixture of 2 ml of acetonitrile and 0.78 ml of pyridine. Then, 0.816 g (8.8 m moles) of phosphorus oxychloride was gradually added thereto under stirring in an ice-water bath. Thereafter, 0.072 ml (4 m moles) of water was added thereto and the reaction was conducted for 6 hours. Ice-Water was added to the reaction mixture to discontinue the reaction and the precipitate formed upon hydrolysis was collected by centrifugation. The thus formed precipitate was placed on a cellulose column (1.7 × 40 cm) and eluted with a solvent of isopropanol-ammonia-water (7:1:2). Fractions having a $R_f$ value of 0.34 as determined by paper chromatography in the same solvent system were pooled and concentrated. To the concentrate was added an ethanolic solution of barium iodide, and the precipitate formed was collected by centrifugation. After washing with ethanol, there was obtained 1.08 g (about 90% yield) of 2-benzylthioadenosine-5'-monophosphate barium salt.

| UV: | $\lambda$max (pH 1) | 273 m$\mu$ ($\epsilon_p$: 13900) |
|---|---|---|
| | $\lambda$max (H$_2$O) | 234 m$\mu$ ($\epsilon_p$: 20100) |
| | | 278 m$\mu$ ($\epsilon_p$: 13400) |
| | $\lambda$max (pH 13) | 278 m$\mu$ ($\epsilon_p$: 13700) |
| $R_f$ value in paper chromatography (solvent: isopropanol/ammonia/water = 7:1:2) | | 0.34 |
| Migration in electrophoresis: (pH 7.5; 0.05M phosphate buffer; 1000 V, 1 hour; control: 5'-adenylic acid, +2.0 cm) | | +1.5 cm |
| Release of inorganic phosphoric acid by 5'-nucleotidase of Crotalus Atrox Venom | | 96 mole % |
| Content of inorganic phosphoric acid: | | 2.5 mole % |

Elementary analysis:

Calcd. for $C_{17}H_{18}O_7N_5SP \cdot Ba \cdot 2H_2O$: C, 31.86; H, 3.46; N, 10.93; P, 4.83 %. Found: C, 31.88; H, 3.11; N, 11.00; P, 4.97 %.

EXAMPLE 6

The compounds listed in Table 1 below were prepared according to the process described in Example 1 or 2 using the corresponding S-substituted 2-thioadenosine. Their physical properties and yields are also shown in Table 1.

Table 2

Inhibition of ADP-induced platelet aggregation by S-substituted 2-thioadenosine 5'-monophosphates

| Compound | Solvent | Molar concn | % Inhibition Rabbit ($10^{-5}$M ADP) | % Inhibition Human ($3\times10^{-6}$M ADP) |
|---|---|---|---|---|
| 2-n-Amylthio AMP** | barium salt | DMSO* | $10^{-4}$ | 83 | |
| | ammonium salt | saline | $0.8\times10^{-4}$ | 80 | |
| | | | $0.8\times10^{-5}$ | 54 | 84 |
| | | | $0.8\times10^{-6}$ | 22 | 54 |
| 2-Allylthio AMP | barium salt | DMSO | $10^{-4}$ | 82 | |
| | ammonium salt | saline | $0.9\times10^{-4}$ | 80 | |
| | | | $0.9\times10^{-5}$ | 59 | 86 |
| | | | $0.9\times10^{-6}$ | 37 | 31 |
| AMP disodium salt | | saline | $10^{-4}$ | 52 | |
| | | | $10^{-5}$ | 35 | |
| | | | $10^{-6}$ | 5 | |
| Adenosine | | DMSO | $10^{-4}$ | 66 | |
| | | saline | $10^{-4}$ | 71 | |
| | | | $10^{-5}$ | 61 | 94 |
| | | | $10^{-6}$ | 37 | 41 |

*DMSO=Dimethylsulfoxide
**AMP=Adenosine 5'-monophosphate

While the invention has been described in detail and with reference to specific embodiments thereof, it will be apparent to one skilled in the art that various changes and modifications can be made therein without departing from the spirit and scope thereof.

Table 1

| Product | Yield (%) | UV($\lambda_{max}^{m}$, pH 1, $\epsilon \times 10^{-3}$) | | $R_f$* | Migration** |
|---|---|---|---|---|---|
| 2-n-Hexylthioadenosine-5'-monophosphate (Ba) | 82 | 273 | 13.8 | 0.74 | 0.69 |
| 2-n-Heptylthioadenosine-5'-monophosphate (Li$_2$) | 78 | 273 | 14.6 | 0.75 | 0.69 |
| 2-n-Octylthioadenoisine-5'-monophsophate (Ba) | 85 | 272 | 13.9 | 0.78 | 0.69 |
| 2-n-Nonylthioadenosine-5'-monophosphate (Ba) | 85 | 273 | 14.8 | 0.84 | 0.68 |
| 2-n-Decylthioadenosine-5'-monophosphate (H) | 75 | 272 | 13.6 | 0.85 | 0.67 |
| 2-(2-Ethyl-n-hexyl)thioadenosine-5'-monophosphate (Ba) | 68 | 273 | 13.9 | 0.79 | 0.68 |
| 2-Cyclopentylthioadenosine-5'-monophosphate (Ba) | 69 | 273 | 14.8 | 0.82 | 0.69 |
| 2-Cyclohexylthioadenosine-5'-monophosphate (Ba) | 70 | 273 | 15.1 | 0.82 | 0.70 |
| 2-Cyclohexylmethylthioadenosine-5'-monophosphate (Ba) | 68 | 272 | 14.8 | 0.83 | 0.72 |
| 2-p-Chlorobenzylthioadenosine-5'-monophosphate (Ba) | 72 | 272 | 13.6 | 0.92 | 0.65 |
| 2-p-Nitrobenzylthioadenosine-5'-monophosphate (Ba) | 78 | 274 | 22.0 | 0.86 | 0.65 |
| 2-trans-Crotylthioadenosine-5'-monophosphate (Ba) | 69 | 273 | 14.2 | 0.70 | 0.72 |
| 2-$\beta$-methallylthioadenosine-5'-monophosphate (Na$_2$) | 53 | 273 | 13.8 | 0.69 | 0.72 |

*$R_f$ value in paper chromatography (solvent: n-propanol/ammonia/water=20:10:3)
**Migration in electrophoresis (pH 7.5, phosphate buffer, relative migration based on adenosine-5'-monophosphate)

Elementary analysis of the above compounds with respect to C, H, N and P showed good consistence with the calculated values.

What is claimed is:

1. S-Substituted 2-thioadenosine-5'-monophosphates represented by the following general formula

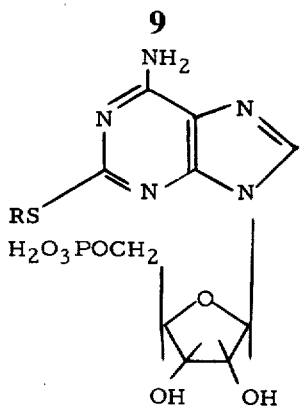

and the alkali metal, alkaline earth metal and ammonium salts thereof, wherein R is selected from the group consisting of a primary or secondary alkyl group having five to 10 carbon atoms, a cycloalkyl group having 5 to 10 carbon atoms, a cycloalkylmethyl group, a benzyl group, a p-nitro- or p-chlorobenzyl group, an allyl group and a β- or γ-methallyl group.

2. 2-n-Hexylthioadenosine-5'-monophosphate and the alkali metal, alkaline earth metal and ammonium salts thereof of claim 1.

3. 2-n-Heptylthioadenosine-5'-monophosphate and the alkali metal, alkaline earth metal and ammonium salts thereof of claim 1.

4. 2-n-Octylthioadenosine-5'-monophosphate and the alkali metal, alkaline earth metal and ammonium salts thereof of claim 1.

5. 2-n-Nonylthioadenosine-5'-monophosphate and the alkali metal, alkaline earth metal and ammonium salts thereof of claim 1.

6. 2n-Decylthioadenosine-5'-monophosphate and the alkali metal, alkaline earth metal and ammonium salts thereof of claim 1.

7. 2-(2-Ethyl-n-hexyl)thioadenosine-5'-monophosphate and the alkali metal, alkaline earth metal and ammonium salts thereof of claim 1.

8. 2-Cyclopentylthioadenosine-5'-monophosphate and the alkali metal, alkaline earth metal and ammonium salts thereof claim 1.

9. 2-Cyclohexylthioadenosine-5'-monophosphate and the alkali metal, alkaline earth metal and ammonium salts thereof of claim 1.

10. 2-Cyclohexylmethylthioadenosine-5'-monophosphate and the alkali metal, alkaline earth metal and ammonium salts thereof of claim 1.

11. 2-p-Chlorobenzylthioadenosine-5'-monophosphate and the alkali metal, alkaline earth metal and ammonium salts thereof of claim 1.

12. 2-p-Nitrobenzylthioadenosine-5'-monophosphate and the alkali metal, alkaline earth metal and ammonium salts thereof of claim 1.

13. 2-trans-Crotylthioadenosine-5'-monophosphate and the alkali metal, alkaline earth metal and ammonium salts thereof of claim 1.

14. 2-β-Methallylthioadenosine-5'-monophosphate and the alkali metal, alkaline earth metal and ammonium salts thereof of claim 1.

15. 2-n-Amylthioadenosine-5'-monophosphate and the alkali metal, alkaline earth metal and ammonium salts thereof of claim 1.

16. 2-iso-Amylthioadenosine-5'-monophosphate and the alkali metal, alkaline earth metal and ammonium salts thereof of claim 1.

17. 2-Allylthioadenosine-5'-monophosphate and the alkali metal, alkaline earth metal and ammonium salts thereof of claim 1.

18. 2-Benzylthioadenosine-5'-monophosphate and the alkali metal, alkaline earth metal and ammonium salts thereof of claim 1.

* * * * *